(12) United States Patent
Shrivastava

(10) Patent No.: US 10,666,575 B2
(45) Date of Patent: May 26, 2020

(54) ASYMMETRIC CO-OPERATIVE QUEUE MANAGEMENT FOR MESSAGES

(71) Applicant: Microsoft Technology Licensing, LLC, Redmond, WA (US)

(72) Inventor: Sulabh Shrivastava, Sammamish, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 16/010,329

(22) Filed: Jun. 15, 2018

(65) Prior Publication Data
US 2019/0386930 A1    Dec. 19, 2019

(51) Int. Cl.
| | |
|---|---|
| *G06F 15/173* | (2006.01) |
| *H04L 12/911* | (2013.01) |
| *H04L 12/26* | (2006.01) |
| *H04L 12/863* | (2013.01) |
| *H04L 12/923* | (2013.01) |
| *H04L 29/08* | (2006.01) |

(52) U.S. Cl.
CPC ............ *H04L 47/822* (2013.01); *H04L 43/16* (2013.01); *H04L 47/50* (2013.01); *H04L 47/762* (2013.01); *H04L 67/1002* (2013.01)

(58) Field of Classification Search
CPC combination set(s) only.
See application file for complete search history.

(56) References Cited

U.S. PATENT DOCUMENTS

| | | |
|---|---|---|
| 6,934,294 B2 | 8/2005 | Bertagna |
| 8,732,342 B1 | 5/2014 | Clark et al. |
| 8,826,284 B1 | 9/2014 | Fuller |
| 9,417,912 B2 | 8/2016 | Suh et al. |
| 9,465,663 B2 | 10/2016 | Mincarelli |
| 2005/0081203 A1 | 4/2005 | Aguilar et al. |
| 2017/0235605 A1 | 8/2017 | Chaloupka et al. |

OTHER PUBLICATIONS

"International Search Report and Written Opinion Issued in PCT Application No. PCT/US19/035912", dated Aug. 12, 2019, 14 Pages.

(Continued)

*Primary Examiner* — Lan Dai T Truong
(74) *Attorney, Agent, or Firm* — Newport IP, LLC; Han Gim; David W. Foster

(57) ABSTRACT

Improved techniques for responding to a server that is overwhelmed with messages are disclosed herein. Messages may initially be placed in an "incoming" queue. Once accepted by the server for processing, a corresponding message may be placed in an accepted queue, and an indication is generated that the message will be processed. When the number of messages in the accepted queue meets or exceeds a defined threshold, new messages addressed to the incoming queue are rejected. Also, computing resources are allocated to the incoming queue until the messages in the incoming queue have been processed (or meet another condition). Once the incoming queue is empty or meets another condition, resources are allocated to the accepted queue. Once the number of messages in the accepted queue meets or falls below a second threshold, new messages are allowed again into the incoming queue.

20 Claims, 14 Drawing Sheets

(56) References Cited

OTHER PUBLICATIONS

Welsh, Mathew, "An Architecture for Highly Concurrent, Well-Conditioned Internet Services", A Dissertation Submitted in Partial Satisfaction of the Requirements for the Degree of Doctor of Philosophy in Computer Science, University of California, Sep. 2002, 211 Pages.

Cohen, J.W., "Analysis of the Asymmetrical Shortest Two-Server Queueing Model", In Journal of Applied Mathematics and Stochastic Analysis, vol. 11, Issue 2, 1998, pp. 115-162.

Duenyas, et al., "Heuristic Scheduling of Parallel Heterogeneous Queues with Set-Ups", In Technical Report 92-60 of University of Michigan, Oct. 1992, pp. 1-30.

ASYMMETRIC CO-OPERATIVE QUEUE MANAGEMENT FOR MESSAGES

BACKGROUND

Messaging servers handle large workloads, collectively processing hundreds of billions of messages a day worldwide. However, a messaging server can become overwhelmed when incoming messages outpace the capacity of the server to process them. Messages sent to an overwhelmed server often remain in a queue until processed, causing delays. When the delays are long enough, a message may time-out, causing the message sender to retry the message. Also, new messages may continue to be received by an overwhelmed messaging server, compounding the delays and time-outs. Furthermore, the resulting backlog reduces computer efficiency as more and more resources are devoted to scheduling messages, leaving fewer resources available to actually process them. As such, it can be appreciated that there is an ongoing need to improve techniques for responding to a server that is overwhelmed with messages.

It is with respect to these considerations and others that the disclosure made herein is presented.

SUMMARY

Improved techniques for responding to a server that is overwhelmed with messages are disclosed herein. Messages may initially be placed in an "incoming" queue. Once accepted by the server for processing, a corresponding message may be placed in an accepted queue, and an indication is generated that the message will be processed. When the number of messages in the accepted queue meets or exceeds a defined threshold, new messages addressed to the incoming queue are rejected. Also, computing resources are allocated to the incoming queue until the messages in the incoming queue have been processed (or meet another condition). Once the incoming queue is empty or meets another condition, resources are allocated to the accepted queue. Once the number of messages in the accepted queue meets or falls below a second threshold, new messages are allowed again into the incoming queue.

In some embodiments, messages, such as emails, are placed in an "incoming" queue. The incoming queue holds messages that have not been accepted by the server—no guarantee has been made that an incoming message will be processed. Once a message is accepted by the server it may be removed from the incoming queue and placed into an "accepted" queue. Messages in the accepted queue are guaranteed to be processed by the server.

In some embodiments, the incoming queue and the accepted queue are cooperative—they share a common pool of computing resources, e.g. processors, memory, network bandwidth, etc., and they yield these resources to each other based on various criteria. For example, in a normal operating state, i.e. when neither queue exceeds a threshold number of messages, computing resources may be allocated in proportion to the size of each queue. However, in some embodiments, the accepted queue may be given more or slightly more than a proportionate amount of resources to avoid accumulating accepted messages.

Additionally or alternatively, when the number of messages in the accepted queue meets or exceeds a threshold, the server may respond by preventing new messages from being added to the incoming queue. Although the incoming queue is blocked, the server may continue to allow messages into the accepted queue. Continuing to allow messages into the accepted queue is counter-intuitive, as the response was triggered by a large number of messages in the accepted queue. Rejecting messages from the incoming queue but allowing messages into the accepted queue prevents runaway scenarios where more new messages are received than can be processed. At the same time, messages that were already in the incoming queue may still be added to the accepted queue and processed.

At the same time, the server may allocate some or all of the computing resources to the incoming queue. Once the number of messages in the incoming queue meets or falls below another threshold, the server may allocate resources to the accepted queue. Resources are allocated in this sequence to prevent large latencies and time-outs for non-accepted messages. Once the number of messages in the accepted queue has met or fallen below another defined threshold, incoming messages may be added to the incoming queue again as processing returns to normal.

The incoming queue may also meet or exceed a threshold number of messages. In some embodiments, the server responds by rejecting subsequent messages from the incoming queue. Also, the server may determine whether the number of messages in the accepted queue is low, either in absolute terms or relative to the number of messages in the incoming queue. If the number of messages in the accepted queue is low, additional resources may be allocated to the incoming queue.

While embodiments having two queues are discussed herein, embodiments with additional queues are similarly contemplated. Also, while embodiments that assign messages to queues based acceptance are discussed herein, other classifications are similarly contemplated, such as by request type, request priority, etc. Also, while reference is made to receiving and processing messages, other objects such as requests, tasks, etc. are similarly contemplated.

It should be appreciated that various aspects of the subject matter described briefly above and in further detail below can be implemented as a hardware device, a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, network appliances, and the others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Figure 1:
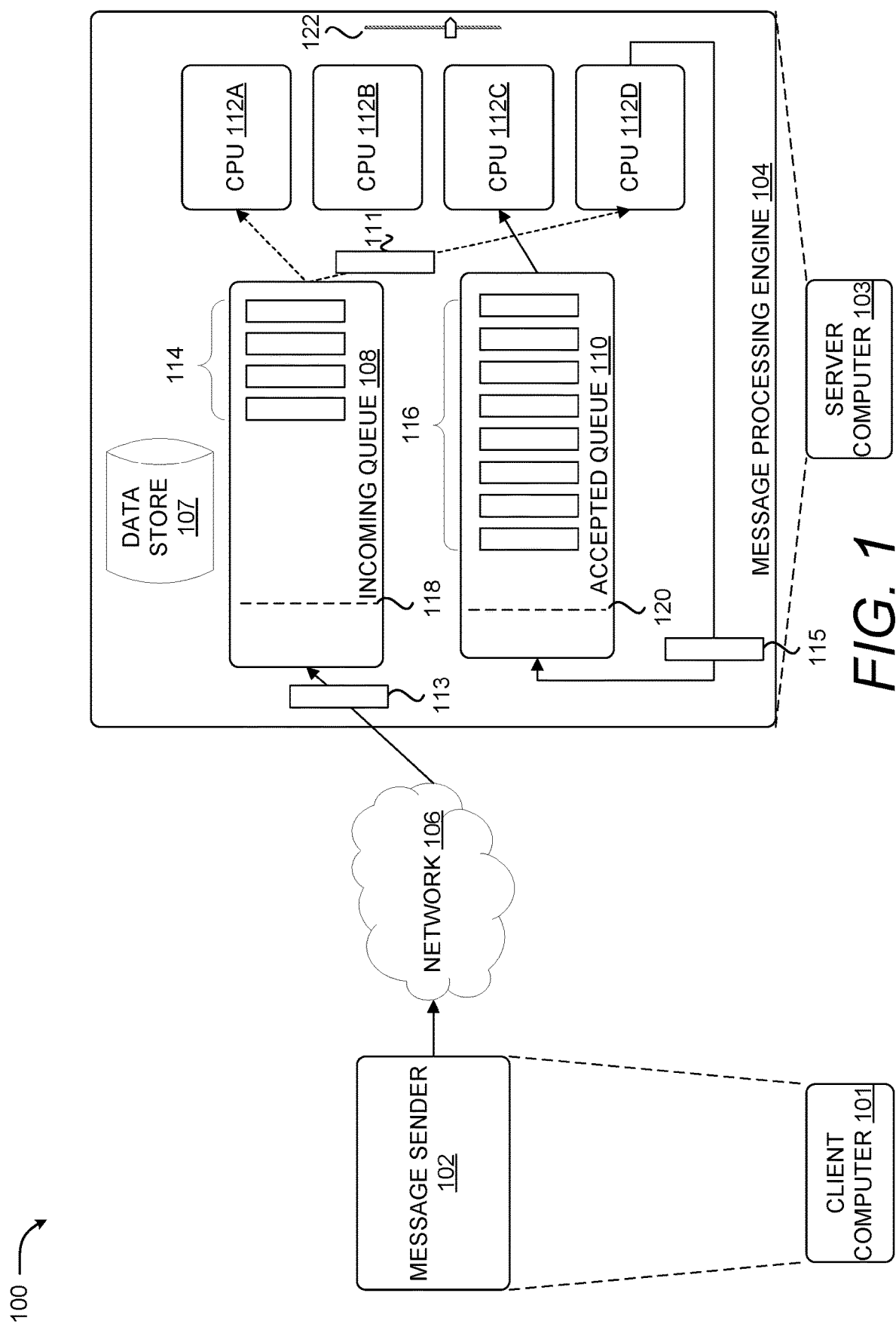
FIG. 1 is a computing system diagram illustrating aspects of an operating environment for the embodiments disclosed herein, including asymmetric, co-operative queues for processing incoming messages.

The following Detailed Description describes improved techniques for a server to handle an overwhelming volume of messages. As mentioned above, asymmetric co-operative queues are used to store messages (also referred to as requests, tasks, etc.) before they are processed by the server. The queues may be asymmetric because they store different types of messages. For example, one queue may store incoming messages received from a message generator before the messages are accepted by the server, while another queue may store messages that have been accepted for processing. In this way messages may be processed in stages, e.g. passing through both queues before being processed completely.

The queues may also be considered asymmetric because the message generator has different expectations based on which queue a message is in. A message received from a message generator and stored in an incoming queue may be dropped (i.e. not handled), and as such no expectation exists that the message will be processed. By not having an expectation that the message will be processed, the message generator may monitor the message for failure or progression to the accepted queue, retrying the message in the event of failure. At the same time, once a message has been added into the accepted queue for processing, the message generator will expect that the message will be processed, allowing the server to handle failure, retries, etc.

In some embodiments, the asymmetric queues are co-operative because they use a common pool of processors, memory, network bandwidth, and other computing resources, and because they yield computing resources to each other when needed. In some embodiments, computing resources are allocated proportionate to the number of items in each queue, or with a bias (e.g. 1-10% or more shift) towards the accepted queue. However, computing resource allocations may change in response to an overwhelming number of messages, as described below.

In some embodiments, a priority is assigned to each queue, and responses to overwhelming numbers of messages are based in part on these priorities. For example, an incoming queue may have a lower priority (also referred to as 'non-preferred'), while an accepted queue may have a higher priority (also referred to as 'preferred'). Details of how queues of different priorities are processed in response to overwhelming number of messages are described below.

In some embodiments, each message is associated with a customer (e.g. a client, customer account, tenant, etc.). Each customer may be associated with a quota of pending IO—a quota of Input/Output, e.g. disk bandwidth, that messages in the incoming and accepted queues will use when being processed. The quota may be based on a number of individuals in the customer's organization, an amount of money the customer has paid, a priority associated with the customer, a number of customers assigned to a particular server, or the like. The quota may be an absolute number, e.g. a number of megabytes, a rate, e.g. a number of kilobytes per second, a percentage of IO bandwidth available on a given server, or the like.

In some embodiments, upon receiving a message from a message generator, a determination is made whether the customer associated with the message is exceeding their quota of pending IO. For example, a message processing engine may determine if the received message would cause the associated customer's pending IO to exceed their quota, and if so, reject the message to the incoming queue.

Additionally or alternatively, a determination may be made if the computing resources of the server are being overburdened. This could happen when a system is set to achieve maximum throughput, putting a near continuous strain on the CPUs and other resources. For example, a determination could be made that an amount or percentage of CPU cycles devoted to message processing has exceeded a defined threshold. Other determinations include detecting a rise in CPU temperature, a high use of electricity, and the like. Once it has been determined that the computing resources of the server are overburdened, in one embodiment, message processing is paused while new messages for the incoming queue are dropped.

FIG. 1 is a computing system diagram illustrating aspects of an operating environment for the embodiments disclosed herein, including asymmetric, co-operative queues for processing incoming messages. As shown in FIG. 1, a system 100 discloses message generator 102 executing on client computer 101, which is in communication over network 106 with message processing engine 104 executing on server computer 103. While FIG. 1 depicts a single message generator 102 and message processing engine 104, multiple message generators and message processing engines, executing on the same and/or multiple computing devices, are similarly contemplated.

In some embodiments, incoming queue 108 includes a first in first out (FIFO) data structure that stores messages 109 received from message generator 102. Incoming queue 108 stores messages 114 until a CPU is available to process them. Message generator 102 has no expectations for a message stored in incoming queue 108—the message may be successfully processed to completion, dropped, time-out, or the like. If the message fails in any way, message generator 102 may re-submit the message, submit the message to a different server, or otherwise handle the failure.

Incoming queue 108 may provide queued messages, e.g. message 111, to one or more of processors (CPUs) 112A-112D. In some embodiments, the processor will immediately process the message. However, in other embodiments, processing the incoming message may include accepting the message and copying it (or a new message derived therefrom, e.g. message 115) into accepted queue 110 for further processing.

In some embodiments, accepted queue 110 stores accepted messages 116. Messages 116 may be processed using the same pool of processing resources (e.g. CPUs 112A-112D). Processing resources may be allocated between incoming queue 108 and accepted queue 110 based on a number of factors described throughout this document. Briefly, however, when message processing engine 104 is in a normal state, i.e. when neither incoming queue 108 nor accepted queue 110 has more than a defined threshold number of items, one embodiment allocates processing resources in proportion to the number of messages in each queue. This allocation is depicted in FIG. 1 by slider 122.

In some embodiments, each queue has a threshold number of messages it can store before a response is triggered. The thresholds may be the same for each queue, or different. The thresholds may be based in part on an amount of computing resources available to process messages. For example, a server with 4 CPUs may have lower thresholds than a server with 8 CPUs. Thresholds may also be based on the amount of time it takes to process a message, which may be a function of computing power and task complexity. Thresholds may be dynamic, based on feedback about server utilization. For example, a threshold may be increased when server 103 is frequently idle, or decreased when server 103 is determined to be running at full capacity for too long. Thresholds may also be user defined, set to a default value, or extracted from a configuration file. As illustrated, threshold 118 is associated with incoming queue 108 while threshold 120 is associated with accepted queue 110, and neither threshold has been met.

Figure 2:
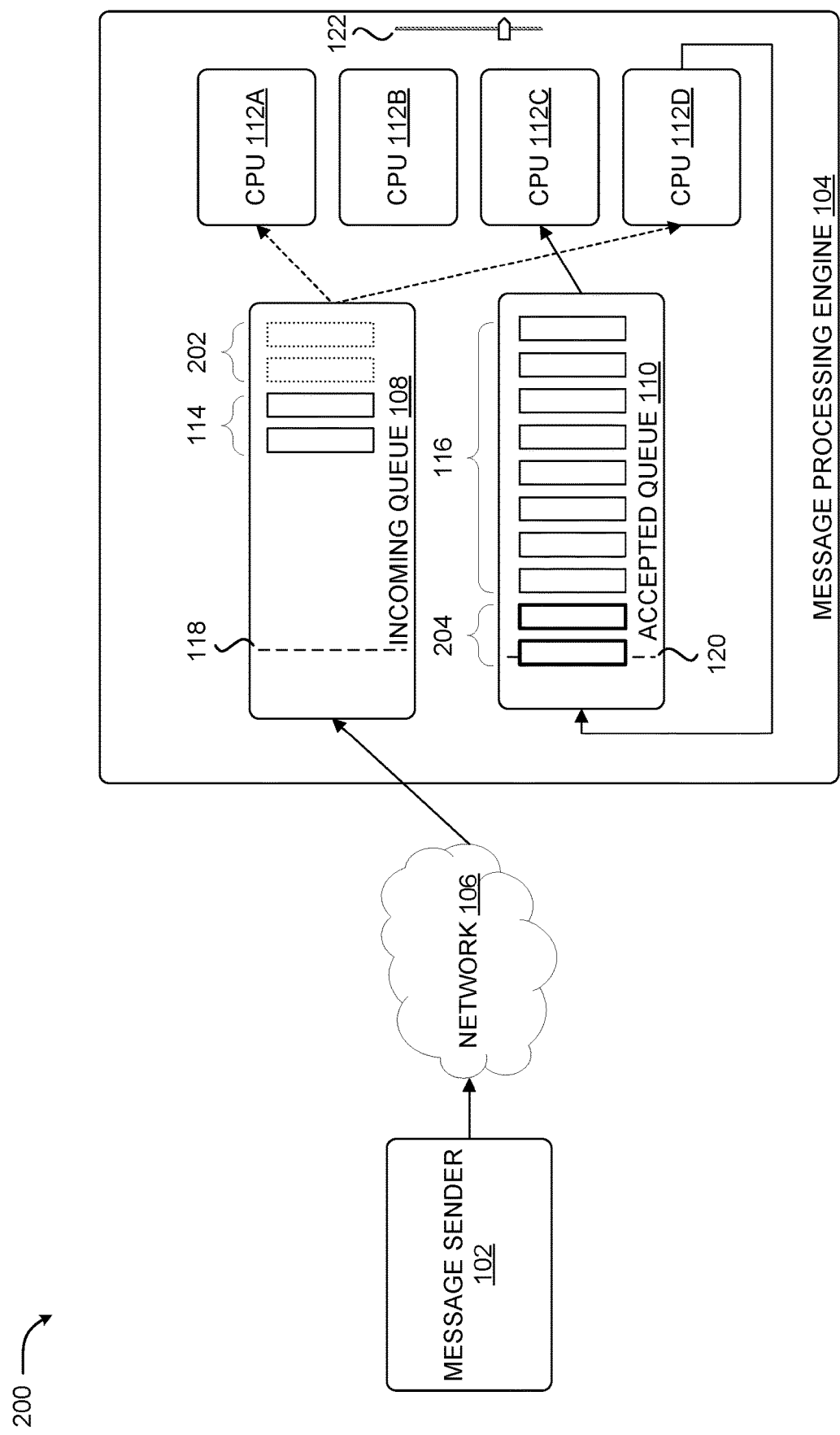
FIG. 2 is a computing system diagram illustrating asymmetric, co-operative queues as the number of messages in the accepted queue meets or exceeds a threshold.

FIG. 2 is a computing system diagram 200 illustrating asymmetric, co-operative queues as the number of messages in the accepted queue passes a threshold. Specifically, FIG. 2 depicts messages 202 having been accepted and placed on accepted queue 110 as messages 204.

Figure 3:
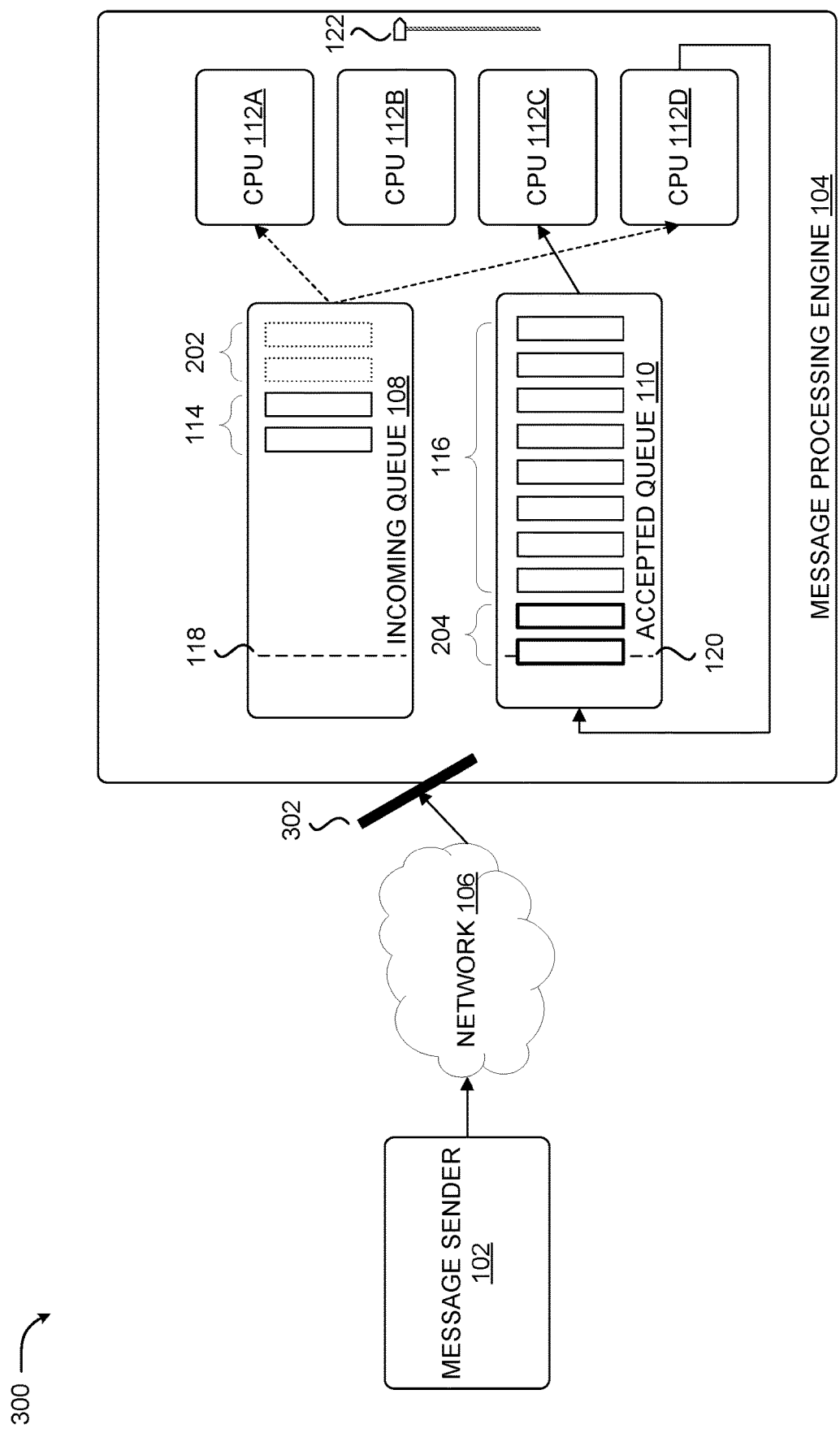
FIG. 3 is a computing system diagram illustrating a response to meeting or exceeding the threshold number of messages in the accepted queue.

FIG. 3 is a computing system diagram 300 illustrating a response to passing the threshold number of messages in the accepted queue. In some embodiments, the response includes rejecting incoming messages to incoming queue 108, as depicted by block 302. Additionally or alternatively, computing resources may be substantially or completely allocated to processing messages 114 in queue 108, as depicted by slider 122 moving towards incoming queue 108.

Figure 4:
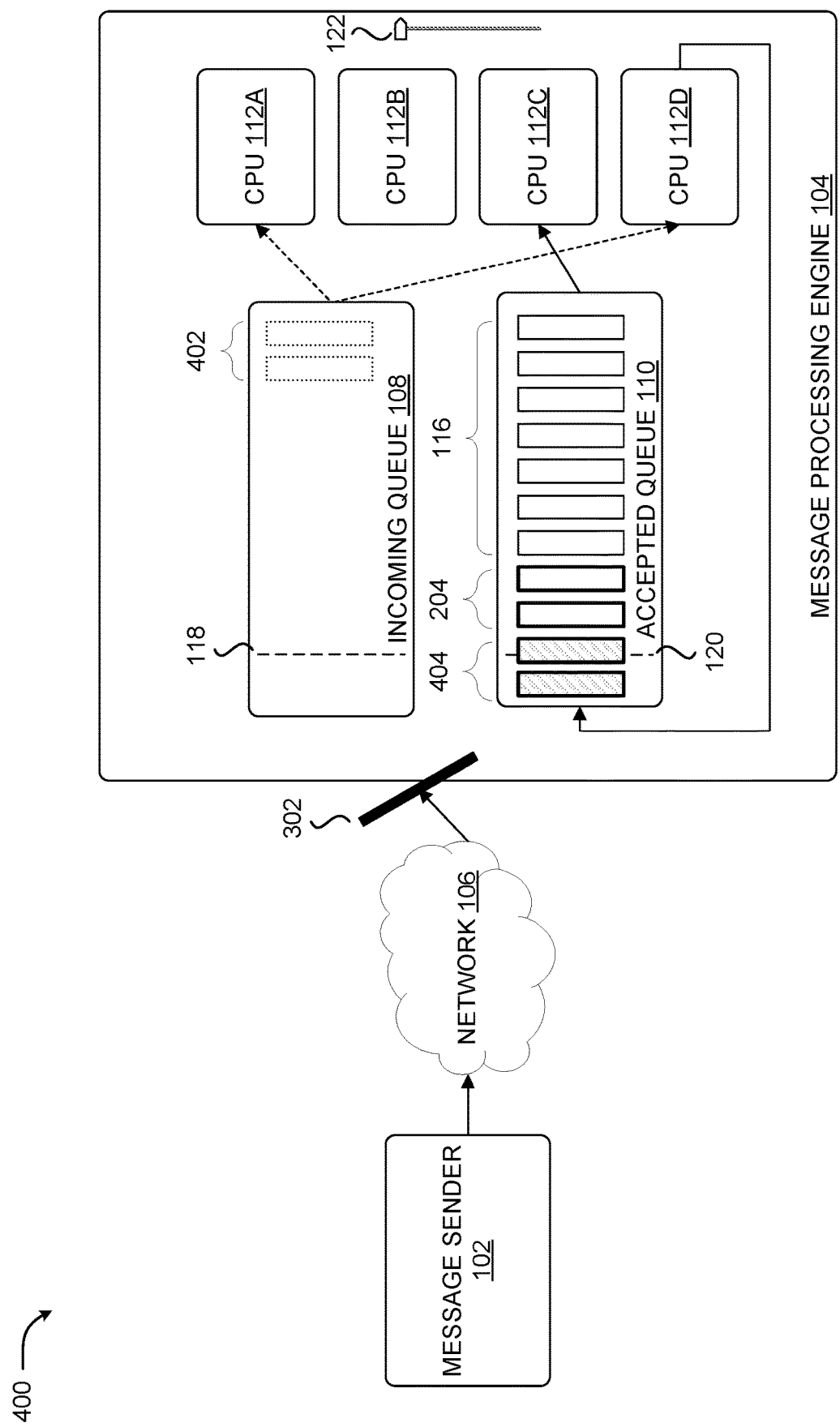
FIG. 4 is a computing system diagram illustrating how messages are preferentially processed from the incoming queue in response to passing the threshold number of messages in the accepted queue.

FIG. 4 is a computing system diagram 400 illustrating how messages are preferentially processed from the incoming queue in response to passing the threshold number of messages in the accepted queue. For example, messages 114 have been accepted by message processing engine 104, as indicated by message outlines 402 in incoming queue 108 and the additional messages 404 located in accepted queue 110.

Figure 5:
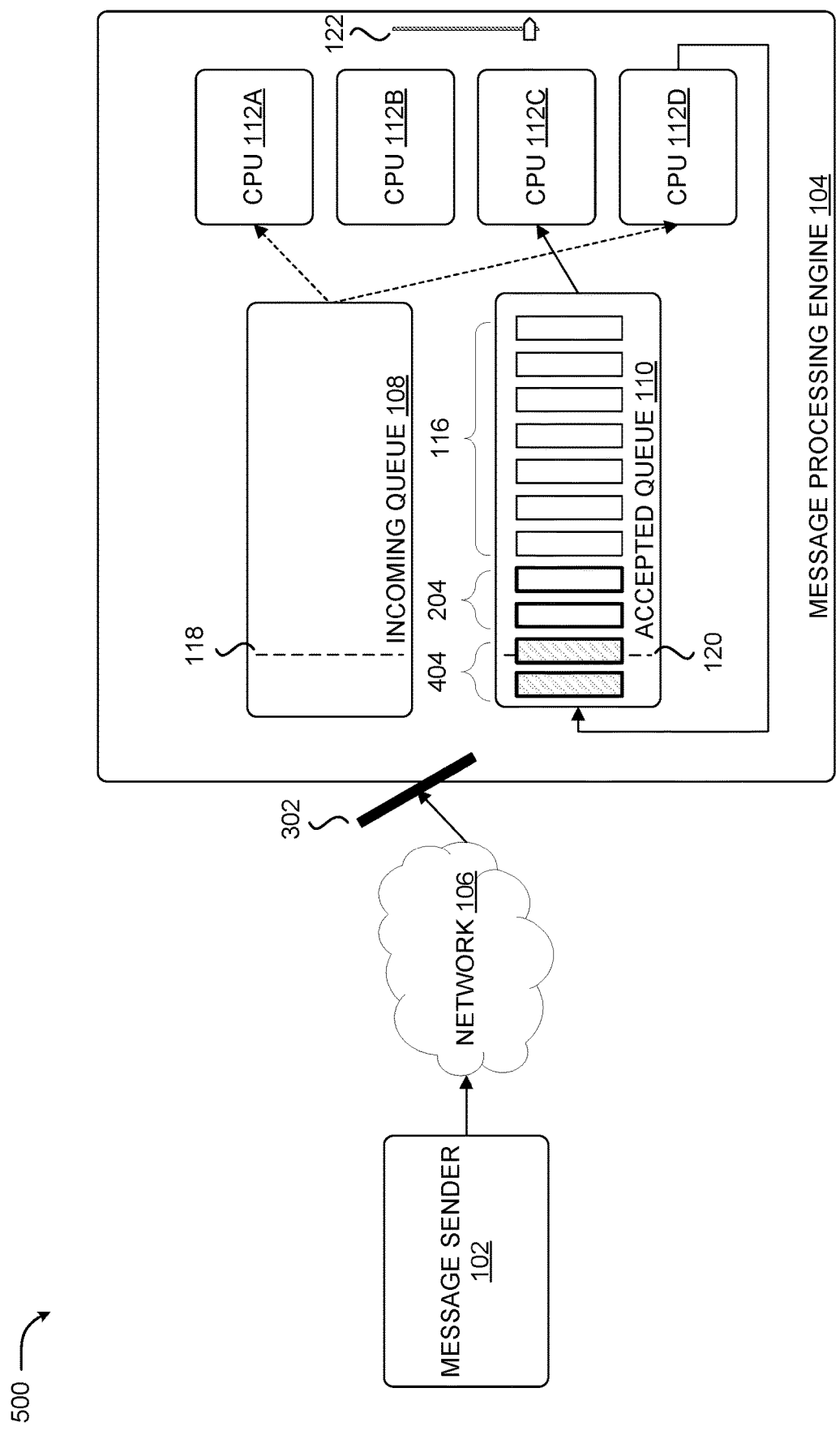
FIG. 5 is a computing system diagram illustrating messages being preferentially processed from the accepted queue after the incoming queue has been exhausted.

FIG. 5 is a computing system diagram 500 illustrating messages being preferentially processed from the accepted queue after the incoming queue has been exhausted. In some embodiments, once income queue 108 has been exhausted, computing resources may be substantially or completely allocated to processing messages from accepted queue 110, as depicted by slider 122 moving towards accepted queue 110.

Figure 6:
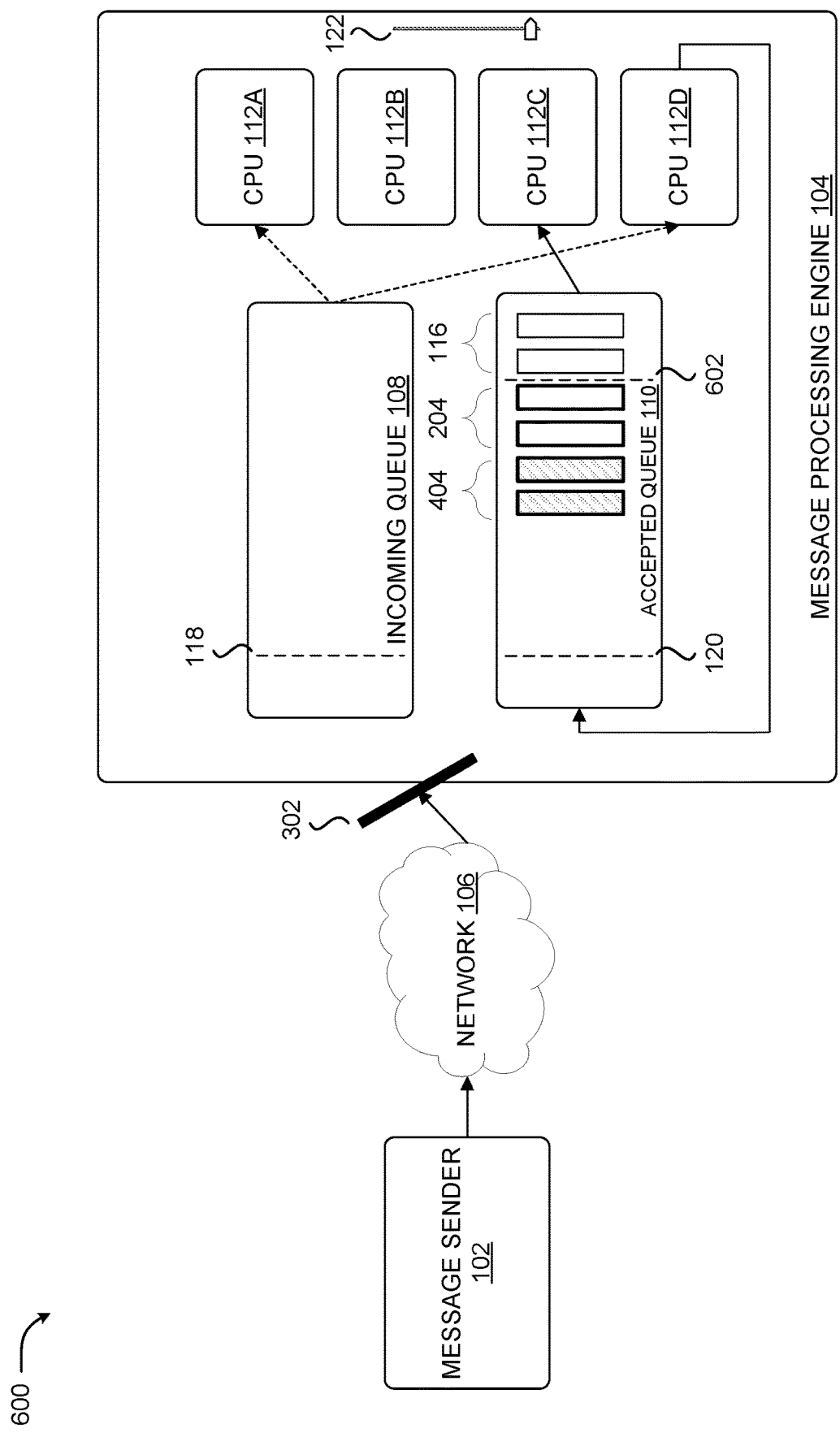
FIG. 6 is a computing system diagram illustrating messages being processed from the accepted queue until another threshold has been crossed.

FIG. 6 is a computing system diagram 600 illustrating messages being processed from the accepted queue until another threshold 602 has been crossed. In some embodiments, many of messages 116 have been processed, dropping the number of messages in the accepted queue 110 below the threshold 120. In some embodiments, processing may return to normal from this state—i.e. the trigger to returning to the normal processing state is dropping below the threshold 120. However, in other embodiments, processing of messages in accepted queue 110 may continue until accepted queue 110 is exhausted, at which point message processing engine 104 may return to a normal processing state.

Figure 7:
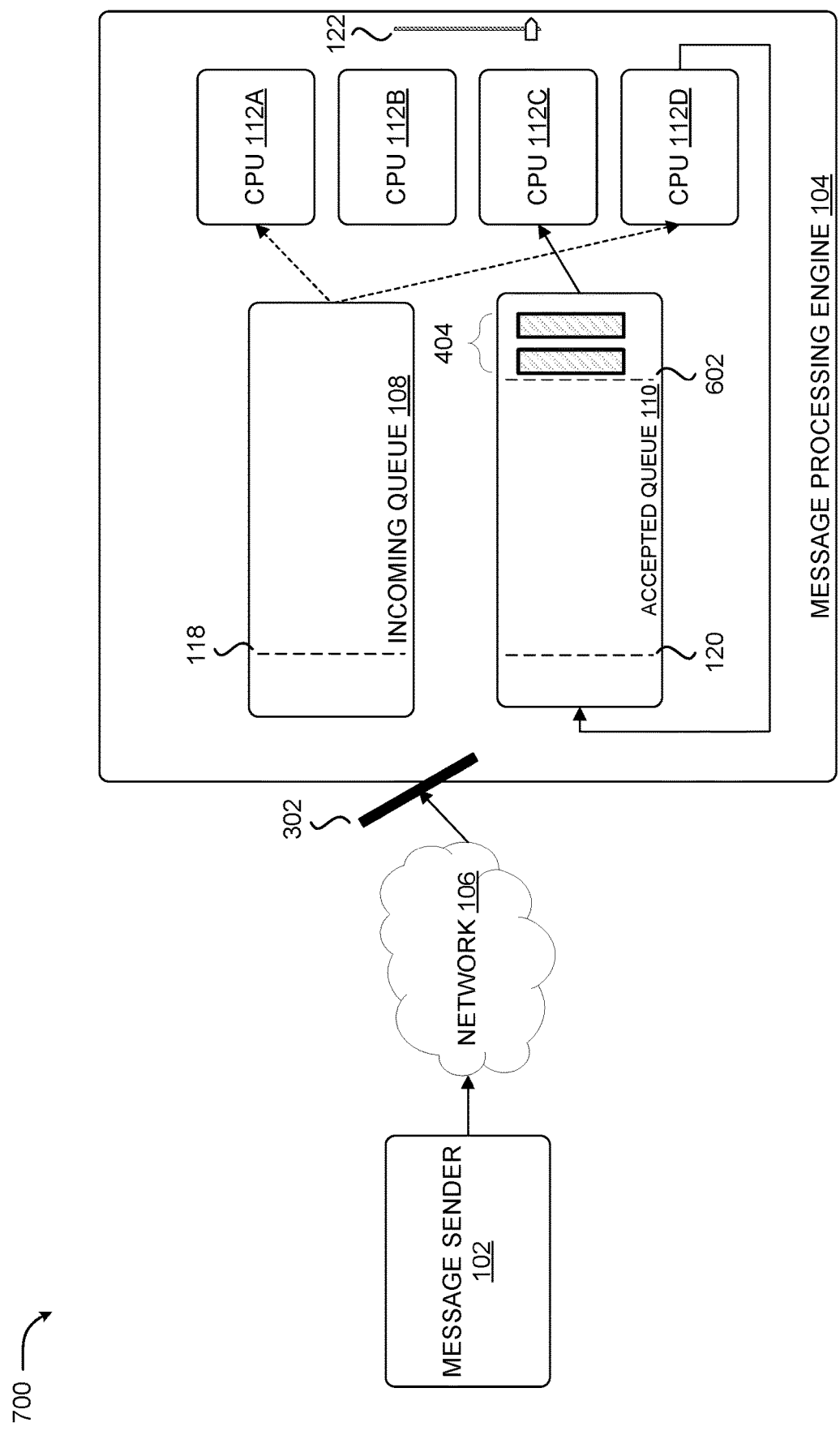
FIG. 7 is a computing system diagram illustrating the number of messages in the accepted queue falling below the other threshold.

FIG. 7 is a computing system diagram 700 illustrating the number of messages in the accepted queue falling below another threshold. In some embodiments, message processing engine 104 returns to a normal processing state after the number of messages in accepted queue 110 crosses below threshold 602.

Figure 8:
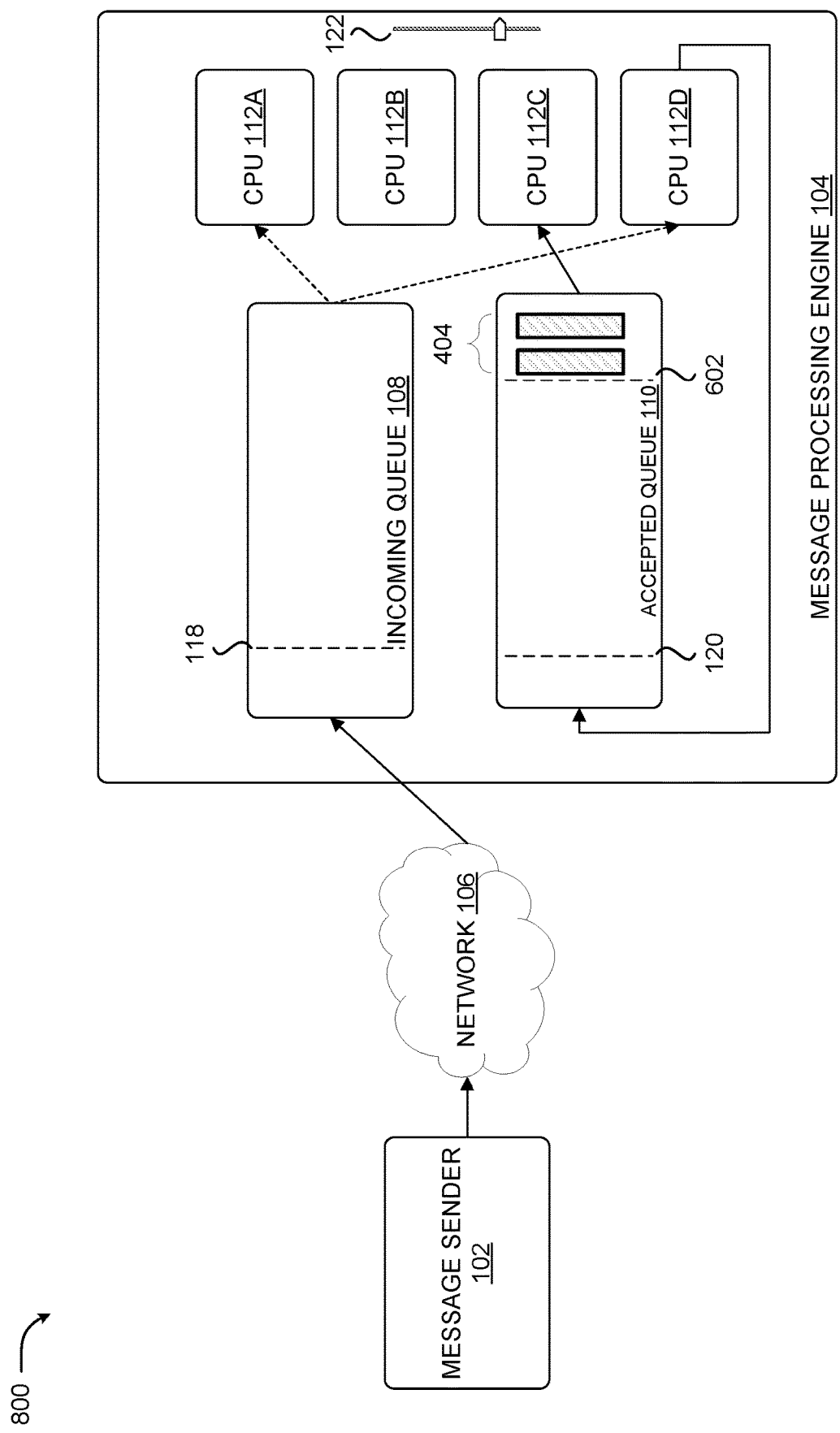
FIG. 8 is a computing system diagram illustrating a response to the number of messages in the accepted queue falling below the other threshold.

FIG. 8 is a computing system diagram 800 illustrating a response to the number of messages in the accepted queue falling below the other threshold 602. In some embodiments, block 302 is removed, allowing new messages into incoming queue 108. At the same time, slider 122 reflects a re-balancing of computing resources away from the substantial or complete allocation to accepted queue 110, as new messages are anticipated to arrive and be processed from incoming queue 108.

Figure 9:
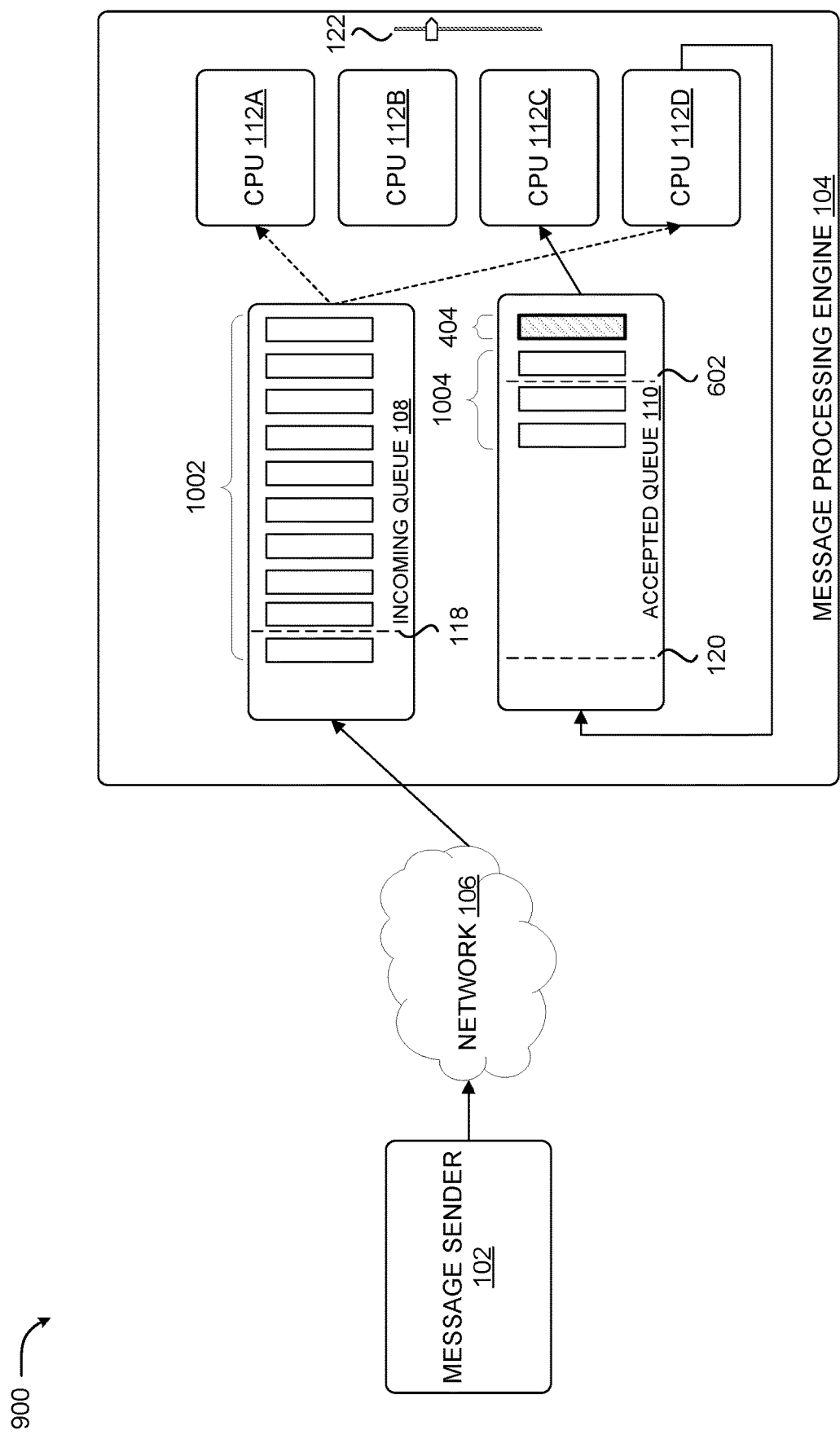
FIG. 9 is a computing system diagram illustrating a number of messages in the incoming queue above a defined threshold.

FIG. 9 is a computing system diagram 900 illustrating a number of messages in the incoming queue above a defined threshold. In some embodiments, slider 122 reflects allocating 70% of computing resources to incoming queue 108, as incoming queue 108 stores approximately 70% of the messages in either queue (10 out of 14). One of messages 404 has yet to be processed, while three messages 1004 have been accepted in the time it has taken for messages 1002 to overwhelm the incoming queue 108.

Figure 10:
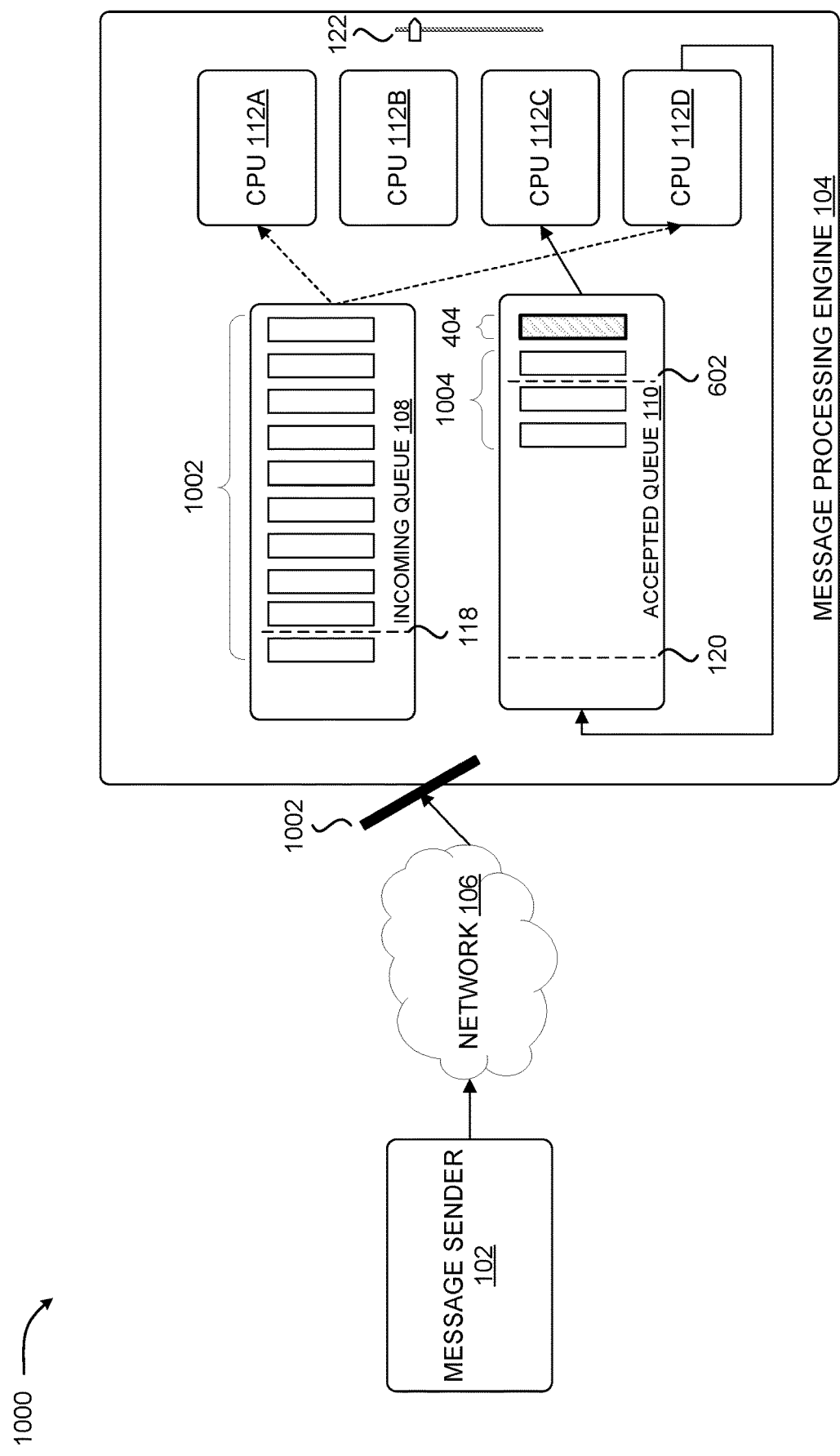
FIG. 10 is a computing system diagram illustrating a response to the number of messages in the incoming queue rising above the defined threshold.

FIG. 10 is a computing system diagram 1000 illustrating a response to the number of messages in the incoming queue rising above the defined threshold. In some embodiments, additional incoming messages are rejected by block 1002 in response to the incoming queue 108 being overwhelmed. By blocking incoming messages, sever 104 is given time to process the existing queued messages. In some embodiments, if the number of messages in accepted queue 110 is low relative to the number of messages in incoming queue 108 (e.g. incoming queue 108 having 2×, 3×, 4×, 10×, or 20× more messages than accepted queue 110, although other rations are similarly contemplated), then processing resources may be biased to favor incoming queue 108.

Figure 11:
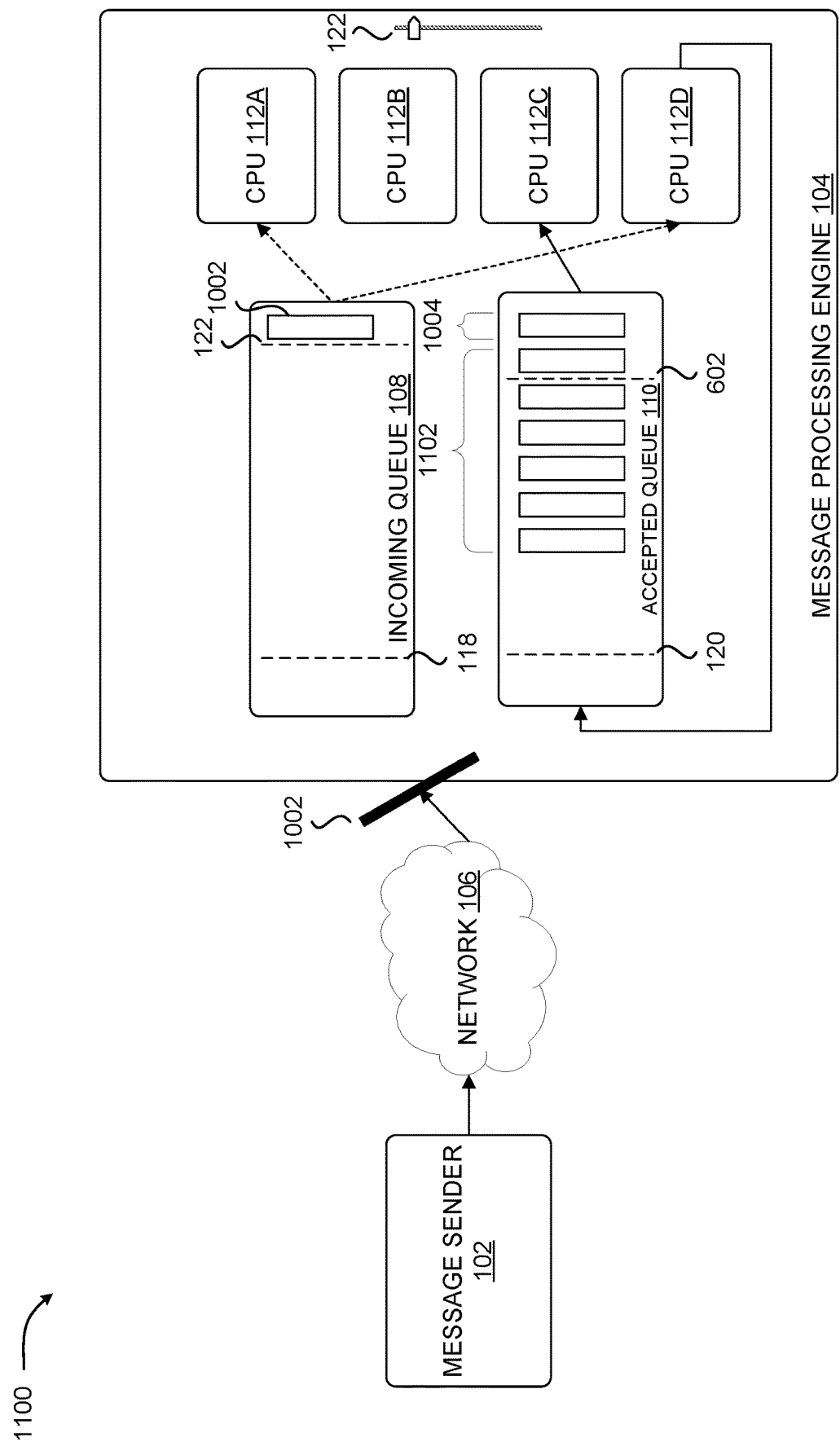
FIG. 11 is a computing system diagram illustrating messages being processed after the response to the number of messages in the incoming queue rising above the defined threshold.

FIG. 11 is a computing system diagram 1100 illustrating messages being processed after implementing the response to the number of messages in the incoming queue rising above the defined threshold. In some embodiments, the number of messages in incoming queue 108 has been reduced below a second threshold 122, triggering the incoming queue to re-open. At the same time, some of the messages 1002 have been accepted into accepted queue 110 as messages 1102.

Figure 12:
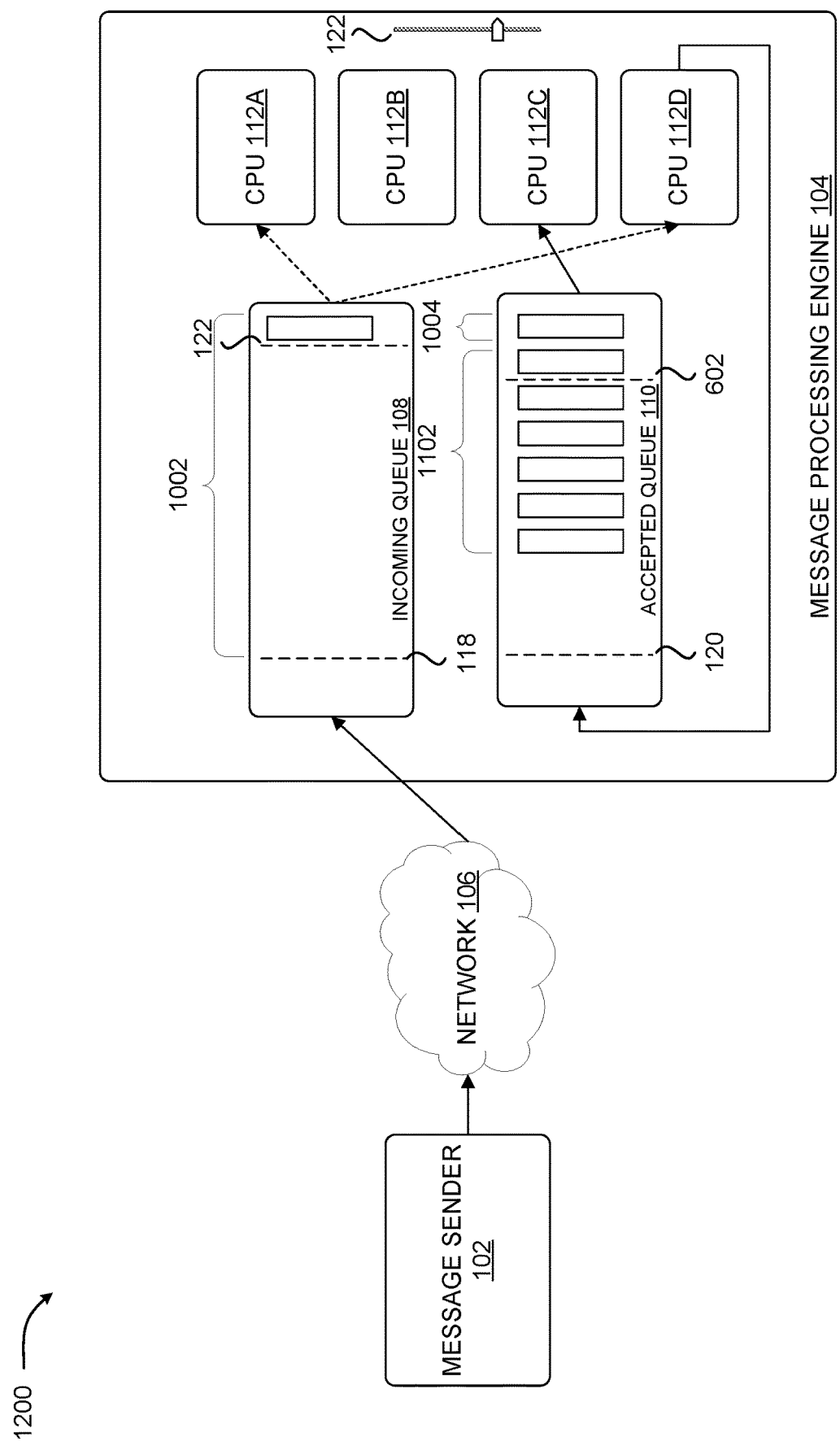
FIG. 12 is a computing system diagram illustrating processing returning to a normal state after the number of messages in the incoming queue passes below another threshold.

FIG. 12 is a computing system diagram 1200 illustrating processing returning to a normal state after the number of messages in the incoming queue passes below the second threshold 122. In some embodiments, block 1002 has been removed and additional messages may be received and processed.

Figure 13:
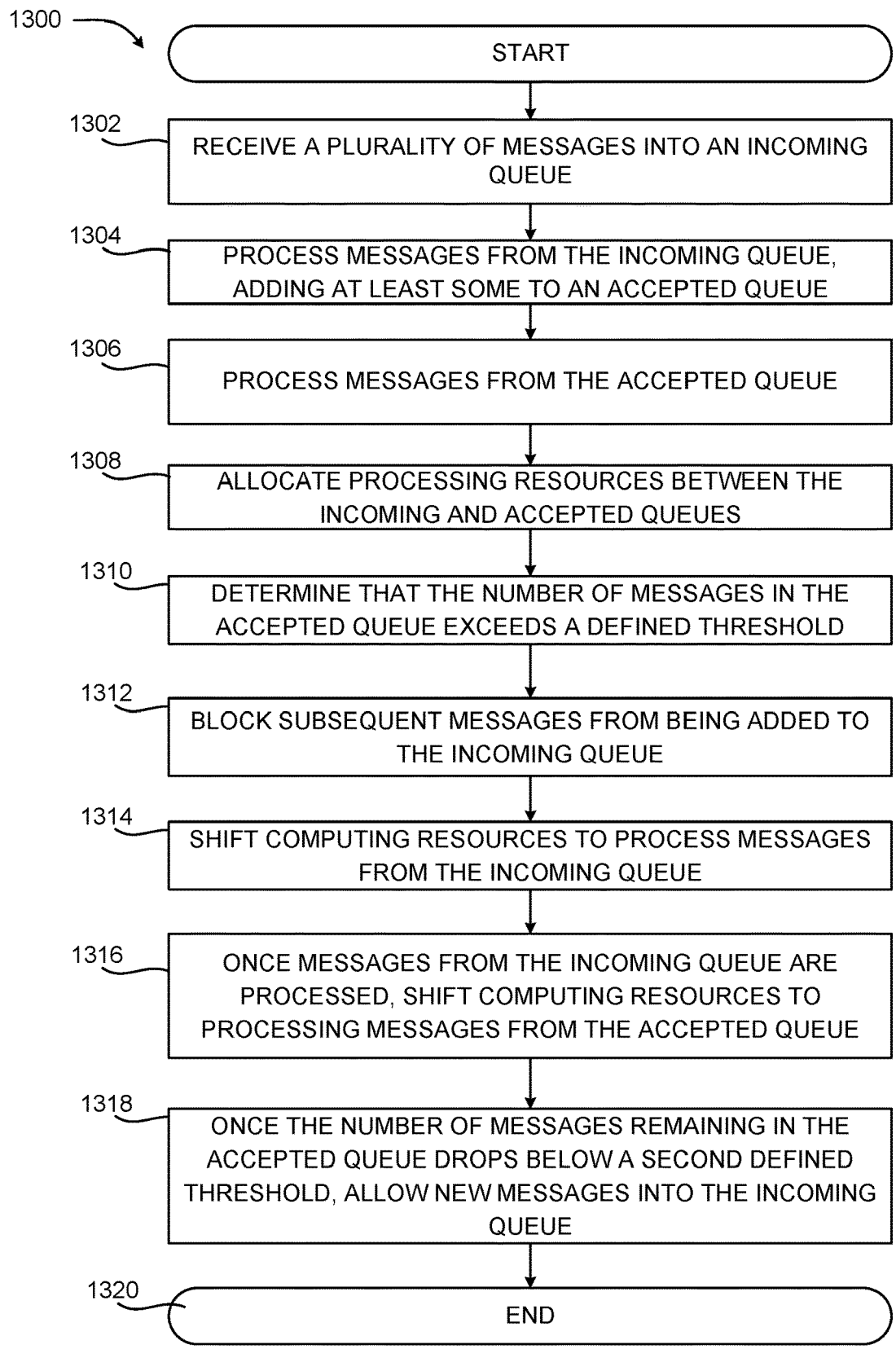
FIG. 13 illustrates aspects of a routine for enabling aspects of the techniques disclosed herein as shown and described below.

FIG. 13 illustrates aspects of a routine 1300 for enabling aspects of the techniques disclosed herein as shown and described above. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 13 and the other FIGS. can be implemented in association with the example computing devices described above with respect to FIGS. 1 through 12. For instance, the various device(s) and/or module(s) described herein can receive, accept, and/or process messages, as well as manage message processing based on computing resource usage, queue capacity, and/or thresholds.

The routine 1300 begins at operation 1302, where the message processing engine 104 executing on server computing device 103 receives a plurality of messages into incoming queue 108. In some embodiments the messages comprise emails, and the message processing engine 104 comprises a messaging server, such as an email server. However, other message types such as web requests, web service requests, text messages, instant messages, database requests, file system requests, or any other type of message sent to a computer is similarly contemplated. In some embodiments, messages are received from a message generator such as a smart phone, tablet, desktop computer, or any other network enabled computing device. The routine 1300 then proceeds from operation 1302 to operation 1304.

At operation 1304, the message processing engine 104 processes one or more messages from the incoming queue. In some embodiments each message is processed by one of a set of processing threads, processors, services, or type of processing device, e.g. CPUs 112A-112D. In some embodiments, processing a message from the incoming queue comprises accepting the message. Accepting a message may include indicating to the calling process, explicitly or implicitly, that the message has been received and will be processed. In some embodiments, accepting a message may include adding the accepted message to accepted queue 110. In some embodiments the calling process (e.g. message generator 102) may expect that an accepted message will be processed. In some embodiments, the accepted queue is given a high priority or otherwise preferred.

The routine 1300 then proceeds to operation 1306, where the message processing engine 104 processes one or more messages from the accepted queue 110. In some embodiments the same set of processing devices used to process messages from incoming queue 108 are used to process messages from accepted queue 110.

The routine 1300 then proceeds to operation 1308, where processing message engine 104 allocates resources between the incoming queue 108 and the accepted queue 110. In some embodiments, computing resources are allocated based on a relative number of messages in each queue. However, in some embodiments, in order to avoid overwhelming the accepted queue 110, processing resources may be biased towards the accepted queue 110.

The routine 1300 then proceeds to operation 1310, where message processing engine 104 determines whether a number of messages in the accepted queue meets or exceeds a defined threshold. Determining whether the number of messages in the accepted queue meets or exceeds a defined threshold may determine whether server computing device 103 is approaching its capacity. Additionally or alternatively, determining that the number of messages in the accepted queue meets or exceeds a defined threshold may indicate that message processing latency is too high.

In some embodiments, the threshold may include an absolute number or a percentage of a maximum queue size. In some embodiments the threshold may be determined dynamically based on a measured throughput of the message processing engine. For example, the message processing engine may try different thresholds and measure the resulting level of throughput (e.g. the number of messages processed per second), and select the threshold yielding the highest throughput. In some embodiments, the threshold may be selected dynamically to minimize message processing latency, e.g. by trying different thresholds, measuring an average message throughput, and select the threshold yielding the lowest latency. In some embodiments, a threshold may be selected based on a combination of these and other factors, balancing a user defined preference for low latency, high throughput, or other metrics such as energy efficiency, propensity for crashes, cooling metrics, or other aspects of operating server computing device 103.

The routine 1300 then proceeds to operation 1312, where message processing engine 104 blocks subsequent messages from being added to the incoming queue 108 in response to determining that the number of messages in the accepted queue exceeds a defined threshold. By blocking messages from being added to incoming queue 108, but allowing messages to continue to be added to accepted queue 110, message processing engine 104 creates breathing room while allowing existing messages to be processed without interruption.

In some embodiments, messages are blocked from being added to the incoming queue 108 by dropping messages (i.e. not responding to them). In other embodiments, message processing engine 104 may return an error code, e.g. an indication that the server is full and temporarily not accepting new processing messages.

The routine 1300 then proceeds to operation 1314, where message processing engine 104 shifts computing resources to process incoming queue 108. In some embodiments, all or substantially all of the computing resources are allocated to process messages from incoming queue 108, leaving few if any resources to process messages from accepted queue 110. In this way, messages in incoming However, in other embodiments, resources may be allocated between the incoming queue 108 and the accepted queue 110 in proportion to the number of messages stored in each, with or without a bias towards incoming queue 108.

The routine 1300 then proceeds to operation 1316, where message processing engine 104 shifts computing resources to process accepted queue 110. In some embodiments, all or substantially all of the computing resources are shifted to processing accepted queue 110 in order to process the messages in accepted queue 110 as quickly as possible.

The routine 1300 then proceeds to operation 1318, where message processing engine 104 determines if a number of messages stored in accepted queue 110 drops below a second threshold. In some embodiments the second threshold is defined as an absolute number of messages, a percentage of the first threshold (e.g. 50% of the first threshold), or the like. Additionally or alternatively the second threshold may be defined dynamically based on feedback of message processing engine. For example, overall throughput, message latency, and other metrics may be assessed when different second thresholds are employed, and one or a combination of these factors may be used to select the second defined threshold. From operation 1318 the routine 1300 proceeds to operation 1320, where it ends.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 14:
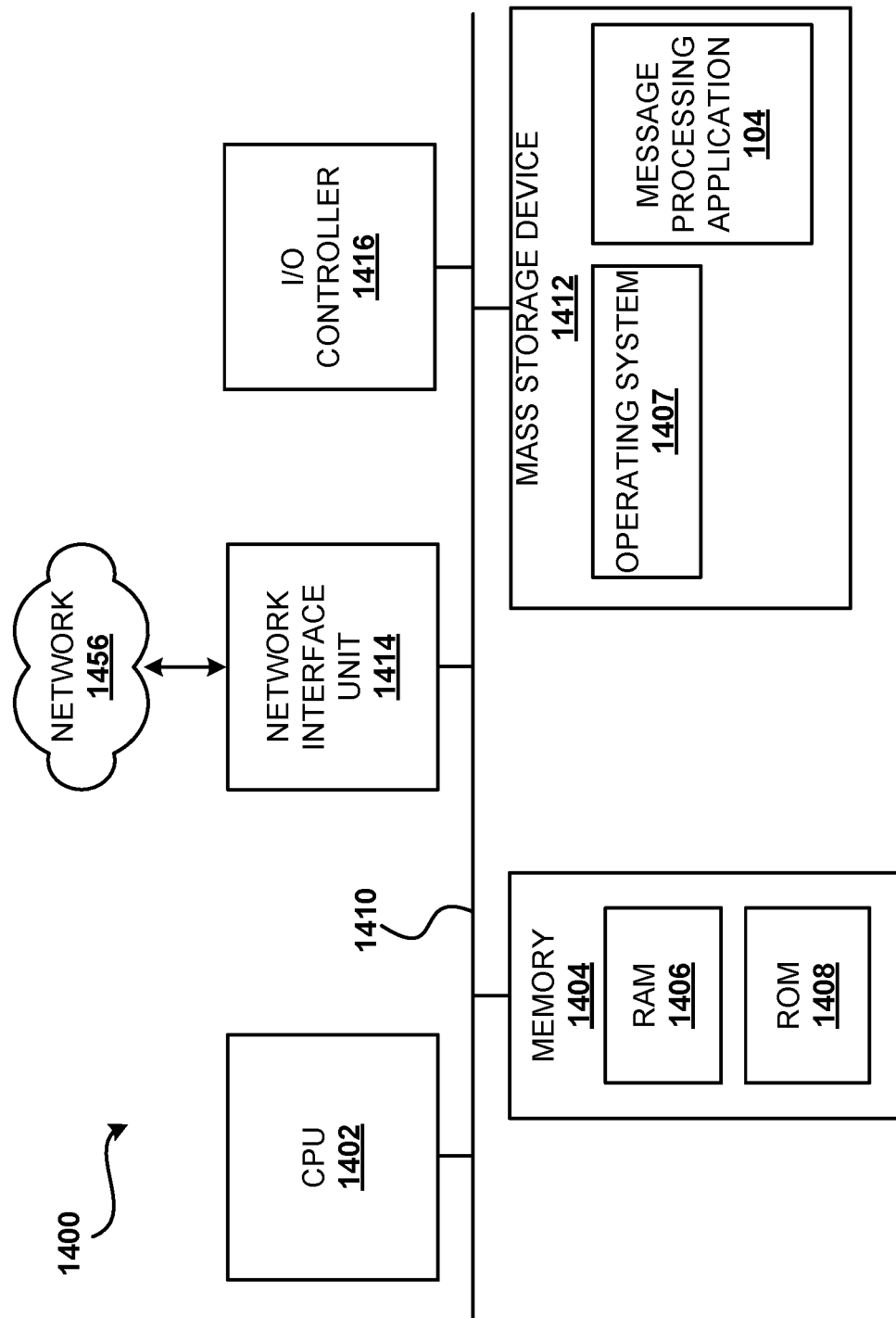
FIG. 14 is a computer architecture diagram illustrating an illustrative computer hardware and software architecture for a computing system capable of implementing aspects of the techniques and technologies presented herein.

FIG. 14 shows additional details of an example computer architecture 1400 for a computer, such as a server computer 103 executing message processing engine 104, capable of executing the program components described herein. Thus, the computer architecture 1400 illustrated in FIG. 14 illustrates an architecture for a server computer, a mobile phone, a PDA, a smart phone, a desktop computer, a netbook computer, a tablet computer, and/or a laptop computer. The computer architecture 1400 may be utilized to execute any aspects of the software components presented herein.

The computer architecture 1400 illustrated in FIG. 14 includes a central processing unit 1402 ("CPU"), a system memory 1404, including a random access memory 1406 ("RAM") and a read-only memory ("ROM") 1408, and a system bus 1410 that couples the memory 1404 to the CPU 1402. A basic input/output system containing the basic routines that help to transfer information between elements within the computer architecture 1400, such as during startup, is stored in the ROM 1408. The computer architecture 1400 further includes a mass storage device 1412 for storing an operating system 1407, other data, and one or more message processing engine 104.

The mass storage device 1412 is connected to the CPU 1402 through a mass storage controller (not shown) connected to the bus 1410. The mass storage device 1412 and its associated computer-readable media provide non-volatile storage for the computer architecture 1400. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1400. For purposes of the claims, the phrase "computer storage medium," "computer-readable storage medium" and variations thereof, does not include waves, signals, and/or other transitory and/or intangible communication media, per se.

According to various configurations, the computer architecture 1400 may operate in a networked environment using logical connections to remote computers through the network 1456 and/or another network (not shown). The computer architecture 1400 may connect to the network 1456 through a network interface unit 1414 connected to the bus 1410. It should be appreciated that the network interface unit 1414 also may be utilized to connect to other types of networks and remote computer systems. The computer architecture 1400 also may include an input/output controller 1416 for receiving and processing input from a number of other devices, including a keyboard, mouse, or electronic stylus (not shown in FIG. 14). Similarly, the input/output controller 1416 may provide output to a display screen, a printer, or other type of output device (also not shown in FIG. 14).

It should be appreciated that the software components described herein may, when loaded into the CPU 1402 and executed, transform the CPU 1402 and the overall computer architecture 1400 from a general-purpose computing system into a special-purpose computing system customized to facilitate the functionality presented herein. The CPU 1402 may be constructed from any number of transistors or other discrete circuit elements, which may individually or collectively assume any number of states. More specifically, the CPU 1402 may operate as a finite-state machine, in response to executable instructions contained within the software modules disclosed herein. These computer-executable instructions may transform the CPU 1402 by specifying how the CPU 1402 transitions between states, thereby transforming the transistors or other discrete hardware elements constituting the CPU 1402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1400 in order to store and execute the software components presented herein. It also should be appreciated that the computer architecture 1400 may include other types of computing devices, including hand-held computers, embedded computer systems, personal digital assistants, and other types of computing devices known to those skilled in the art. It is also contemplated that the computer architecture 1400 may not include all of the components shown in FIG. 14, may include other components that are not explicitly shown in FIG. 14, or may utilize an architecture completely different than that shown in FIG. 14.

EXAMPLE CLAUSES

The disclosure presented herein encompasses the subject matter set forth in the following example clauses.

Example 1

A system comprising: one or more data processing units (1402); and a computer-readable medium (1404) having encoded thereon computer-executable instructions (104) to cause the one or more data processing units (1402) to: receive a plurality of messages (113) into an incoming queue (108); add at least one of the plurality of messages (115) to an accepted queue (110), wherein the incoming queue (108) and the accepted queue (110) share computing resources (112); determine that a number of messages in the accepted queue (110) exceeds a threshold number (120); in response to determining that the number of messages in the accepted queue (110) exceeds the threshold number (120): block (302) subsequent messages from entering the incoming queue (108); shift computing resources (112) to process messages in the incoming queue (108); in response to the messages from the incoming queue (108) being processed, allocate computing resources (112) to process messages from the accepted queue (110); and remove the block (302) to allow messages into the incoming queue (108).

Example 2

The system of Example 1, wherein messages are processed from the accepted queue (110) until accepted queue (110) has been exhausted.

Example 3

The system of Example 1, wherein messages are processed from the accepted queue (110) until the number of messages in the requested queue (110) falls below a second threshold (602).

Example 4

The system of Example 1, wherein messages are allowed to be added to accepted queue (110) while blocking subsequent messages from the incoming queue (108).

Example 5

The system of Example 1, wherein adding at least one of the plurality of messages (115) to the accepted queue (110) includes processing a message (114) stored in the incoming queue (108) with the shared computing resources (112).

Example 6

The system of Example 1, wherein the computer-executable instructions (104) further cause the one or more data processing units (1402) to: determine when a number of messages in the incoming queue (108) exceeds an incoming queue threshold (118); in response to determining that the number of messages in the incoming queue (108) exceeds the incoming queue threshold (118): block (302) subsequent messages from entering the incoming queue (108); determine if the number of message in the incoming queue (108) substantially exceeds the number of messages in the accepted queue (110); and when the number of messages in the incoming queue (108) substantially exceeds the number of messages in the accepted queue (110), biasing computing resources in favor of the incoming queue (108).

Example 7

The system of Example 1, wherein each message is associated with a customer account, wherein customer accounts have a quota of pending Input/Output (TO) operations, and wherein messages from customers who have surpassed the quota of pending IO are prohibited from adding messages to the incoming queue (108).

Example 8

The system of Example 1, wherein the quota of pending IO operations is calculated based on an estimated amount of IO to complete messages in the incoming queue (108) and the accepted queue (110).

Example 9

The system of Example 1, wherein when the incoming queue (108) and the accepted queue (110) do not exceed their respective thresholds, allocating shared computing resources in proportion to the number of messages in each queue.

Example 10

The system of Example 9, wherein shared computing resources are biased towards the accepted queue (110).

Example 11

A system comprising: one or more data processing units (1402); and a computer-readable medium (1404) having encoded thereon computer-executable instructions (104) to cause the one or more data processing units (1402) to: receive a plurality of messages (113) into an incoming queue (108); add at least one of the plurality of messages (115) to an accepted queue (110), wherein the incoming queue (108) and the accepted queue (110) share computing resources (112); determine that a number of messages in the accepted queue (110) exceeds a threshold number (120); in response to determining that the number of messages in the accepted queue (110) exceeds the threshold number (120): block (302) subsequent messages from entering the incoming queue (108); in response to the messages from the incoming queue (108) being processed, allocate computing resources (112) to process messages from the accepted queue (110); and remove the block (302) to allow messages into the incoming queue (108).

Example 12

The system of Example 11, wherein messages are processed from the accepted queue (110) until accepted queue (110) has been exhausted.

Example 13

The system of Example 11, wherein messages are processed from the accepted queue (110) until the number of messages in the requested queue (110) falls below a second threshold (602).

Example 14

The system of Example 11, wherein messages are allowed to be added to accepted queue (110) while blocking subsequent messages from the incoming queue (108).

Example 15

A method employed by a computing device comprising: receiving a plurality of messages (113) into an incoming queue (108); adding at least one of the plurality of messages (115) to an accepted queue (110), wherein the incoming queue (108) and the accepted queue (110) share computing resources (112); determining that a number of messages in the accepted queue (110) exceeds a threshold number (120); in response to determining that the number of messages in the accepted queue (110) exceeds the threshold number (120): blocking (302) subsequent messages from entering the incoming queue (108); in response to the messages from the incoming queue (108) being processed, allocating computing resources (112) to process messages from the accepted queue (110); and removing the block (302) to allow messages into the incoming queue (108).

Example 16

The method of Example 15, further including detecting when computing resources 112 are overwhelmed, and, in response to detecting that computing resources 112 are overwhelmed, stopping processing of messages from both incoming queue (108) and accepted queue (110).

Example 17

The method of Example 15, further comprising: determine when a number of messages in the incoming queue (108) exceeds an incoming queue threshold (118); in response to determining that the number of messages in the incoming queue (108) exceeds the incoming queue threshold (118): block (302) subsequent messages from entering the incoming queue (108); determine if the number of message in the incoming queue (108) substantially exceeds the number of messages in the accepted queue (110); and when the number of messages in the incoming queue (108) substantially exceeds the number of messages in the accepted queue (110), biasing computing resources in favor of the incoming queue (108).

Example 18

The method of Example 15, wherein each message is associated with a customer account, wherein customer accounts have a quota of pending Input/Output (IO) operations, and wherein messages from customers who have surpassed the quota of pending IO are prohibited from adding messages to the incoming queue (108).

Example 19

The method of Example 15, wherein the quota of pending IO operations is calculated based on an estimated amount of IO to complete messages in the incoming queue (108) and the accepted queue (110).

Example 20

The method of Example 15, wherein messages are processed from the accepted queue (110) until the number of messages in the requested queue (110) falls below a second threshold (602).

Among many other technical benefits, the technologies herein enable more efficient use of computing resources such as processor cycles, memory, network bandwidth, and power, as compared to previous solutions that overwhelm server computers with messages. Another technical benefit is reducing message processing latency and avoiding message timeouts when the server is overburdened. Other technical benefits not specifically mentioned herein can also be realized through implementations of the disclosed subject matter.

Although the techniques have been described in language specific to structural features and/or methodological acts, it is to be understood that the appended claims are not necessarily limited to the features or acts described. Rather, the features and acts are described as example implementations of such techniques.

What is claimed is:

1. A system comprising:
one or more data processing units; and
a computer-readable medium having encoded thereon computer-executable instructions to cause the one or more data processing units to:
receive a plurality of messages into an incoming queue;
add at least one of the plurality of messages to an accepted queue, wherein the incoming queue and the accepted queue share computing resources;
determine that a number of messages in the accepted queue exceeds a threshold number;
in response to determining that the number of messages in the accepted queue exceeds the threshold number:
block subsequent messages from entering the incoming queue;
shift computing resources to process messages in the incoming queue;
in response to the messages from the incoming queue being processed, allocate computing resources to process messages from the accepted queue; and
remove the block to allow messages into the incoming queue.

2. The system of claim 1, wherein messages are processed from the accepted queue until the accepted queue has been exhausted.

3. The system of claim 1, wherein messages are processed from the accepted queue until the number of messages in the accepted queue falls below a second threshold.

4. The system of claim 1, wherein messages are allowed to be added to the accepted queue while blocking subsequent messages from the incoming queue.

5. The system of claim 1, wherein adding at least one of the plurality of messages to the accepted queue includes processing a message stored in the incoming queue with the shared computing resources.

6. The system of claim 1, wherein the computer-executable instructions further cause the one or more data processing units to:
determine when a number of messages in the incoming queue exceeds an incoming queue threshold;
in response to determining that the number of messages in the incoming queue exceeds the incoming queue threshold:
block subsequent messages from entering the incoming queue;
determine if the number of messages in the incoming queue substantially exceeds the number of messages in the accepted queue; and
when the number of messages in the incoming queue substantially exceeds the number of messages in the accepted queue, biasing computing resources in favor of the incoming queue.

7. The system of claim 1, wherein each message is associated with a customer account, wherein customer accounts have a quota of pending Input/Output (TO) operations, and wherein messages from customers who have surpassed the quota of pending IO are prohibited from adding messages to the incoming queue.

8. The system of claim 1, wherein the quota of pending IO operations is calculated based on an estimated amount of IO to complete messages in the incoming queue and the accepted queue.

9. The system of claim 1, wherein when the incoming queue and the accepted queue do not exceed their respective thresholds, allocating shared computing resources in proportion to the number of messages in each queue.

10. The system of claim 9, wherein shared computing resources are biased towards the accepted queue.

11. A system comprising:
one or more data processing units; and
a computer-readable medium having encoded thereon computer-executable instructions to cause the one or more data processing units to:
receive a plurality of messages into an incoming queue;
add at least one of the plurality of messages to an accepted queue, wherein the incoming queue and the accepted queue share computing resources;
determine that a number of messages in the accepted queue exceeds a threshold number;
in response to determining that the number of messages in the accepted queue exceeds the threshold number:
block subsequent messages from entering the incoming queue;
in response to the messages from the incoming queue being processed, allocate computing resources to process messages from the accepted queue; and
remove the block to allow messages into the incoming queue.

12. The system of claim 11, wherein messages are processed from the accepted queue until the accepted queue has been exhausted.

13. The system of claim 11, wherein messages are processed from the accepted queue until the number of messages in the accepted queue falls below a second threshold.

14. The system of claim 11, wherein messages are allowed to be added to the accepted queue while blocking subsequent messages from the incoming queue.

15. A method employed by a computing device comprising:
receiving a plurality of messages into an incoming queue;
adding at least one of the plurality of messages to an accepted queue, wherein the incoming queue and the accepted queue share computing resources;
determining that a number of messages in the accepted queue exceeds a threshold number;
in response to determining that the number of messages in the accepted queue exceeds the threshold number:
blocking subsequent messages from entering the incoming queue;
in response to the messages from the incoming queue being processed, allocating computing resources to process messages from the accepted queue; and
removing the block to allow messages into the incoming queue.

16. The method of claim 15, further including detecting when computing resources are overwhelmed, and, in response to detecting that computing resources are overwhelmed, stopping processing of messages from both the incoming queue and the accepted queue.

17. The method of claim 15, further comprising:
determine when a number of messages in the incoming queue exceeds an incoming queue threshold;
in response to determining that the number of messages in the incoming queue exceeds the incoming queue threshold:
block subsequent messages from entering the incoming queue;
determine if the number of messages in the incoming queue substantially exceeds the number of messages in the accepted queue; and
when the number of messages in the incoming queue substantially exceeds the number of messages in the accepted queue, biasing computing resources in favor of the incoming queue.

18. The method of claim 15, wherein each message is associated with a customer account, wherein customer accounts have a quota of pending Input/Output (TO) operations, and wherein messages from customers who have surpassed the quota of pending IO are prohibited from adding messages to the incoming queue.

19. The method of claim 15, wherein the quota of pending IO operations is calculated based on an estimated amount of IO to complete messages in the incoming queue and the accepted queue.

20. The method of claim 15, wherein messages are processed from the accepted queue until the number of messages in the accepted queue falls below a second threshold.

* * * * *